(12) United States Patent
Kim et al.

(10) Patent No.: US 11,867,959 B2
(45) Date of Patent: Jan. 9, 2024

(54) ELECTRICAL AND OPTICAL CABLE DEVICE WITH SHIELDING SHELL GROUNDED TO AN INTERNAL CIRCUIT BOARD

(71) Applicant: SAMSUNG ELECTRONICS CO., LTD., Suwon-si (KR)

(72) Inventors: Jin Sub Kim, Suwon-si (KR); Baek Seok Ko, Suwon-si (KR); Sun Woo Kim, Suwon-si (KR); Dong Jin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 17/285,278

(22) PCT Filed: Aug. 16, 2019

(86) PCT No.: PCT/KR2019/010440
§ 371 (c)(1),
(2) Date: Apr. 14, 2021

(87) PCT Pub. No.: WO2020/080661
PCT Pub. Date: Apr. 23, 2020

(65) Prior Publication Data
US 2021/0382253 A1    Dec. 9, 2021

(30) Foreign Application Priority Data

Oct. 17, 2018  (KR) .................. 10-2018-0124089

(51) Int. Cl.
*G02B 6/42* (2006.01)
*H01R 13/6581* (2011.01)
(Continued)

(52) U.S. Cl.
CPC .......... *G02B 6/4277* (2013.01); *G02B 6/428* (2013.01); *H01R 13/46* (2013.01);
(Continued)

(58) Field of Classification Search
CPC ........ G02B 6/4277; G02B 6/428; G02B 6/24; G02B 6/4201; G02B 6/4274;
(Continued)

(56) References Cited

U.S. PATENT DOCUMENTS 6,979,135 B2 * 12/2005 Ohe ..................... G02B 6/4246
398/139
7,083,472 B2    8/2006 Gordon et al.
(Continued)

FOREIGN PATENT DOCUMENTS

EP    2 034 554 A1    3/2009
EP    2034554 A1 *    3/2009 ........... H01Q 1/1271
(Continued)

OTHER PUBLICATIONS

International Search Report dated Dec. 17, 2019 from International Application No. PCT/KR2019/010440, 4 pages.
(Continued)

*Primary Examiner* — Abdullah A Riyami
*Assistant Examiner* — Justin M Kratt
(74) *Attorney, Agent, or Firm* — STAAS & HALSEY LLP

(57) ABSTRACT

Disclosed herein is a cable device including a cable configured to transmit power and a connector connected to the cable, the cable device including a connector with improved electromagnetic interference (EMI) shielding performance. The cable device includes a cable, and a connector connected to the cable. The connector includes a printed circuit board including a ground electrode, and a shield case provided to accommodate the printed circuit board therein,
(Continued)

the shield case including a contact portion provided in direct contact with the ground electrode.

13 Claims, 10 Drawing Sheets

(51) Int. Cl.
| | |
|---|---|
| *H01R 13/6594* | (2011.01) |
| *H01R 24/60* | (2011.01) |
| *H01R 13/46* | (2006.01) |
| *G02B 6/24* | (2006.01) |
| *H01R 107/00* | (2006.01) |
| *H01R 13/658* | (2011.01) |

(52) U.S. Cl.
CPC ..... *H01R 13/6581* (2013.01); *H01R 13/6594* (2013.01); *H01R 24/60* (2013.01); *G02B 6/24* (2013.01); *G02B 6/4201* (2013.01); *G02B 6/4274* (2013.01); *G02B 6/4292* (2013.01); *G02B 6/4293* (2013.01); *H01R 13/658* (2013.01); *H01R 2107/00* (2013.01)

(58) Field of Classification Search
CPC .... G02B 6/4292; G02B 6/4293; H01R 13/46; H01R 13/6581; H01R 13/6594; H01R 24/60; H01R 13/658; H01R 2107/00
See application file for complete search history.

(56) References Cited

U.S. PATENT DOCUMENTS

| | | | |
|---|---|---|---|
| 9,620,890 B1* | 4/2017 | Vino, IV | ............... G02B 6/4293 |
| 2001/0053624 A1 | 12/2001 | Medina et al. | |
| 2002/0181853 A1 | 12/2002 | Ido et al. | |
| 2003/0026516 A1 | 2/2003 | Hwang et al. | |
| 2013/0210273 A1* | 8/2013 | Wu | ................... H01R 13/6592 |
| | | | 439/607.34 |
| 2016/0285215 A1 | 9/2016 | Little et al. | |

FOREIGN PATENT DOCUMENTS

| | | |
|---|---|---|
| JP | 2014-204986 | 10/2014 |
| JP | 2017-215438 | 12/2017 |

OTHER PUBLICATIONS

Extended European Search Report dated Oct. 15, 2021 from European Application No. 19874170.4.
European Office Action dated Mar. 1, 2023 for European Application No. 19874170.4.
Korean Office Action dated Jun. 27, 2023 for Korean Application No. 10-2018-0124089.

* cited by examiner

ELECTRICAL AND OPTICAL CABLE DEVICE WITH SHIELDING SHELL GROUNDED TO AN INTERNAL CIRCUIT BOARD

CROSS-REFERENCE TO RELATED APPLICATIONS

This application is a U.S. National Stage Application, which claims the benefit under 35 U.S.C. § 371 of PCT International Patent Application No. PCT/KR2019/010440, filed Aug. 16, 2019 which claims the foreign priority benefit under 35 U.S.C. § 119 of Korean Patent Application No. 10-2018-0124089, filed Oct. 17, 2018, the contents of which are incorporated herein by reference.

TECHNICAL FIELD

The present disclosure relates to a cable device including an optical cable capable of high-voltage power transmission and a connector connected to the optical cable, and more particularly, a cable device including a connector having improved electromagnetic interference (EMI) shielding performance.

BACKGROUND ART

Electromagnetic interference (EMI) is an obstacle that electromagnetic signals are affected by electromagnetic disturbance, and a difficulty caused by the EMI has been increased due to the increase in the use of the electromagnetic wave technology. Accordingly, electronic products have been required to have an electromagnetic shielding structure.

A cable may include a conductor such as a copper wire for high voltage power transmission. The cable may have an electromagnetic shielding structure surrounding the conductor to shield electromagnetic waves generated from the conductor.

A cable including the electromagnetic shielding structure may have a black color or a prominent primary color. When the cable in the black color or the primary color is connected to an electronic device, the cable may be exposed to the outside of the electronic device and degrade the appearance because the cable is easily identified with the naked eye.

A cable without an electromagnetic shielding structure is also called an invisible cable because it is difficult to be identified with the naked eye. Recently, the invisible cable has become popular to prevent the design degradation of the electronic device caused by the colored cable.

However, such an invisible cable has a difficulty in shielding electromagnetic waves of a connector connected to the invisible cable.

DISCLOSURE

Technical Problem

The present disclosure is directed to providing a cable device including an invisible cable, which does not include an electromagnetic shielding structure, and a connector connected to the invisible cable and having improved electromagnetic interference (EMI) shielding performance.

Further, the present disclosure is directed to providing a cable device including a shield case provided in contact with a ground electrode of a printed circuit board.

Further, the present disclosure is directed to providing a cable device including a connector having improved electromagnetic interference (EMI) shielding performance without mounting a separate structure on a printed circuit board.

Technical Solution

One aspect of the present disclosure provides a cable device including a cable, and a connector connected to the cable. The connector includes a printed circuit board including a ground electrode, and a shield case provided to accommodate the printed circuit board therein, the shield case including a contact portion provided in direct contact with the ground electrode.

The cable may include a conductor provided to transmit power and an optical fiber provided to transmit an optical signal.

The shield case may include a conductive material to be electrically connected to the ground electrode by contact with the ground electrode.

The cable may further include a sheath provided to accommodate the conductor and the optical fiber therein, and provided to transmit light.

The contact portion may be formed by cutting and bending a portion of the shield case.

The shield case may further include a cut-out portion formed together with the contact portion and provided to allow an inside of the shield case to communicate with an outside of the shield case.

The shield case may further include a support portion provided to support the printed circuit board to prevent the contact portion and the ground electrode from being separated from each other.

In response to the contact portion being in contact with a first surface of the printed circuit board, the support portion may be in contact with a second surface of the printed circuit board opposite to the first surface.

The ground electrode may be provided on an upper surface or a lower surface of the printed circuit board.

The ground electrode may be provided on an upper surface or a lower surface of the printed circuit board, respectively.

The contact portion and the support portion may be provided to be elastically deformable, respectively.

The contact portion and the support portion may be disposed inside the shield case so as to be in contact with the printed circuit board.

The connector may include an optical element mounted on the printed circuit board, and a driver integrated circuit (IC) mounted on the printed circuit board and configured to control the optical element.

The optical element and the driver IC may be mounted on the printed circuit board by die bonding.

The connector may include an outer case provided to accommodate the shield case therein and including an insulating material, and a plug connected to the printed circuit board and provided to connect a connection portion of an external device to the connector.

Another aspect of the present disclosure provides a cable device including a cable including a conductor provided to transmit power, and a connector connected to the cable. The connector includes a printed circuit board including a ground electrode, and a shield case provided to cover an entire surface of the printed circuit board, the shield case including a contact portion provided in direct contact with the ground electrode.

The cable device may further include an optical fiber provided to transmit an optical signal, and a sheath provided to accommodate the conductor and the optical fiber therein so as to protect the conductor and the optical fiber.

The sheath may be invisible.

The contact portion may be formed by cutting and bending a portion of the shield case.

The shield case may have conductivity to have the same potential as the ground electrode by contact with the ground electrode.

Another aspect of the present disclosure provides a cable device including a cable including a conductor and a sheath provided to cover the conductor, and a connector connected to the cable. The connector includes a printed circuit board including a ground electrode, a shield case provided to accommodate the printed circuit board therein and provided to have conductivity, and a contact portion formed by cutting and bending a portion of the shield case so as to connect the shield case to the ground electrode.

Advantageous Effects

A cable device includes an invisible cable, which does not include an electromagnetic shielding structure, and a connector connected to the invisible cable and having improved electromagnetic interference (EMI) shielding performance.

A cable device includes a shield case provided in contact with a ground electrode of a printed circuit board.

A cable device includes a connector having improved electromagnetic interference (EMI) shielding performance without mounting a separate structure on a printed circuit board.

MODES OF THE INVENTION

Figure 1:
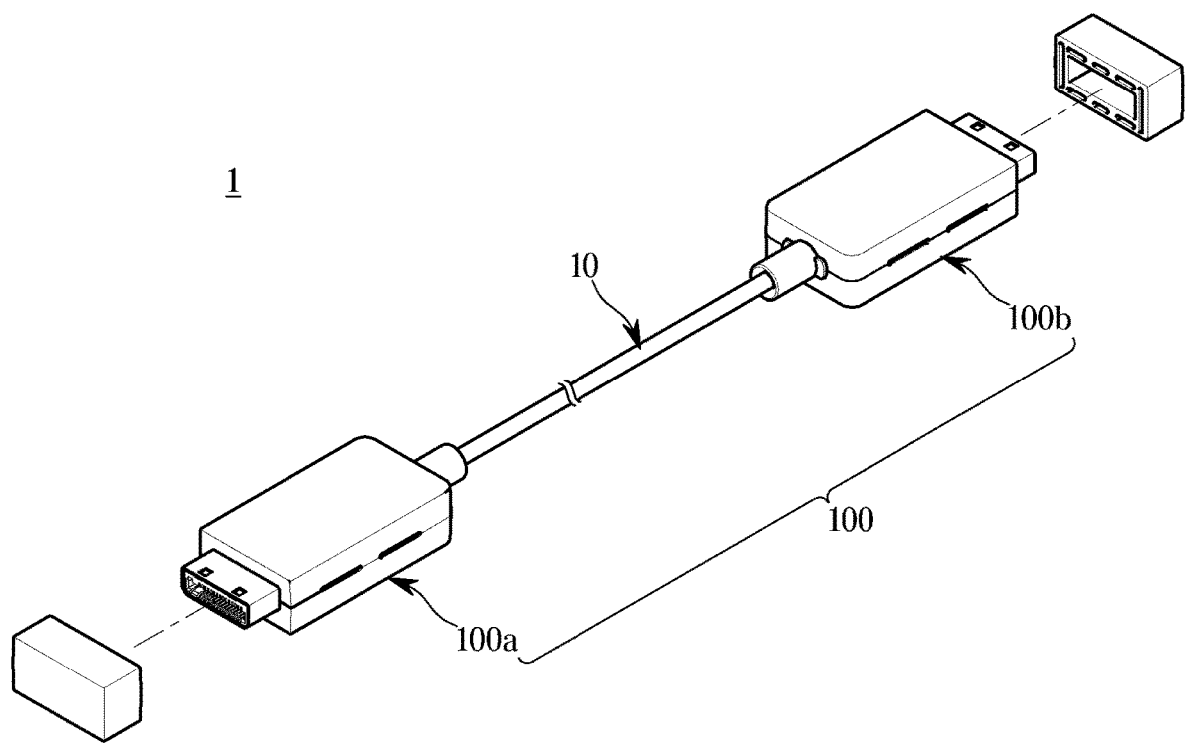
FIG. 1 is a perspective view of a cable device according to one embodiment of the present disclosure.

Embodiments described in the disclosure and configurations illustrated in the drawings are merely examples of the embodiments of the disclosure, and may be modified in various different ways at the time of filing of the present application to replace the embodiments and drawings of the disclosure.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

An electronic device connected to a cable device according to various embodiments of the present disclosure will be described. First, examples of application of the electronic device according to one embodiment of the present disclosure include all mobile communication terminals that operate based on communication protocols corresponding to various communication systems and further include all information and communication devices, multimedia devices, and application devices therefor, such as a videophone, an e-book reader, a laptop personal computer, a netbook computer, a personal digital assistant (PDA), a portable multimedia player (PMP), a MPEG-1 audio layer-3 (MP3) player, mobile medical equipment, a camera, or a wearable device (e.g., a head-mounted-device (HMD) such as electronic glasses, electronic clothing, an electronic bracelet, an electronic necklace, an electronic accessory (appcessory), an electronic tattoo, or a smart watch).

According to some embodiments, an electronic device may be a smart home appliance. Smart home appliances may include at least one of a television, a digital video disk (DVD) player, an audio player, a refrigerator, an air conditioner, a vacuum cleaner, an oven, a microwave, a washing machine, an air purifier, a set-top box, and a TV box (for example, Samsung HomeSync™, Apple TV™, or Google TV™), a game console, an electronic dictionary, an electronic key, a camcorder, or an electronic frame.

According to some embodiments, an electronic device may include at least one of various medical equipment (for example, magnetic resonance angiography (MRA), magnetic resonance imaging (MRI), computed tomography (CT), an imager, an ultrasound device, etc.), a navigation device, a global positioning system (GPS) receiver, an event data recorder (EDR), a flight data recorder (FDR), an automobile infotainment device, electronic equipment for a ship (e.g. a navigation device for a ship and gyro compass, etc.), an avionics device, a security device, a vehicle head unit, a robot for industrial use or home use, an automated teller machine (ATM) of a financial institution, or a point of sales (POS) of a store.

According to some embodiments, an electronic device may include at least one of furniture or a piece of building/structure including a communication function, an electronic board, an electronic signature receiving device, a projector, or various measuring devices (for example, water meters, electricity meters, gas meters, or radio wave measuring devices).

An electronic device according to various embodiments of the present disclosure may be one or a combination of the aforementioned various devices. Also, an electronic device according to various embodiments of the present disclosure may be a flexible device. In addition, it is apparent to those skilled in the art that the electronic device according to various embodiments of the present disclosure is not limited to the above-described devices.

Hereinafter an elastic member may include a first elastic member to a third elastic member.

Figure 2:
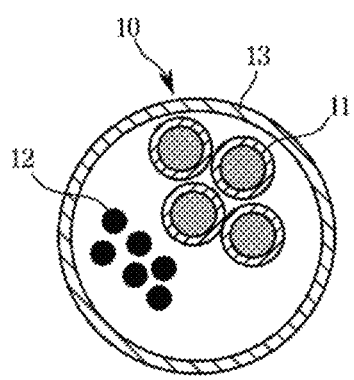
FIG. 2 is a cross-sectional view of a cable in the cable device, according to one embodiment of the present disclosure.
Figure 3:
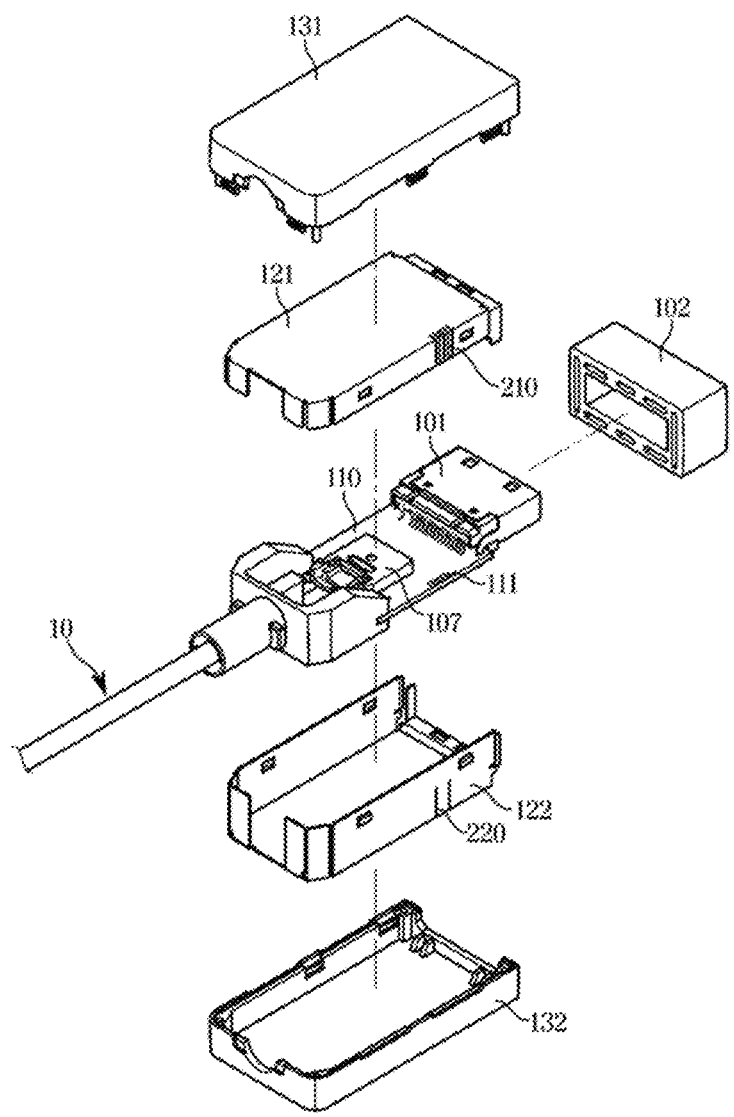
FIG. 3 is an exploded perspective view of the cable device according to one embodiment of the present disclosure.

Hereinafter exemplary embodiments of the present disclosure will be described in detail with reference to the accompanying drawings FIG. 1 is a perspective view of a cable device according to one embodiment of the present disclosure. FIG. 2 is a cross-sectional view of a cable in the cable device, according to one embodiment of the present disclosure. FIG. 3 is an exploded perspective view of the cable device according to one embodiment of the present disclosure.

Referring to FIG. 1, a cable device 1 according to one embodiment of the present disclosure may include a cable 10 and a connector 100 connected to the cable 10. The connector 100 may include a first connector 100a connected to a first external device (not shown) and a second connector 100b connected to a second external device (not shown). The cable 10 may be provided to interconnect the first connector 100a and the second connector 100b. The first connector 100a and the second connector 100b may be provided in the same configuration. Because the first connector 100a and the second connector 100b are provided in the same configuration, the connector 100 will be described below.

The connector 100 may include a plug 101 provided to be coupled to a plug receiver (not shown) of an external device (not shown), and a plug cap 102 provided to cover the plug 101 so as to prevent foreign substance, such as dust, from entering the plug 101. The plug cap 102 may be removably coupled to the plug 101 and thus the plug cap 102 may be separated from the plug 101 in response to that the plug 101 is coupled to the plug receiver. When the cable device 1 is not in use, a user can couple the plug cap 102 to the plug 101, thereby preventing foreign substance, such as dust, from entering the plug 101.

The connector 100 may include outer cases 131 and 132 provided to accommodate at least a portion of the plug 101. The outer cases 131 and 132 may function as a grip portion. A user may grip the outer cases 131 and 132 with his/her fingers, and couple the plug 101 to the plug receiver (not shown) of the external device. When a user grips the outer cases 131 and 132, there is a risk of electric shock if current flows through the outer cases 131 and 132. To prevent this, the outer cases 131 and 132 may be formed of an insulating material.

An internal structure of the cable in the cable device according to one embodiment of the present disclosure will be described with reference to FIG. 2.

Referring to FIG. 2, the cable 10 may include a conductor 11, an optical fiber 12, and a sheath 13 provided to accommodate the conductor 11 and the optical fiber 12 therein. The conductor 11 may be provided to transmit power from a first external device (not shown) to a second external device (not shown) or from the second external device to the first external device. The optical fiber 12 may be provided to transmit an optical signal from the first external device to the second external device or from the second external device to the first external device.

According to the present disclosure, because the cable 10 includes the conductor 11 provided to transmit power, the cable 10 may transmit the power from the first external device to the second external device or from the second external device to the first external device.

The conductor 11 may include a copper wire. Each of the conductor 11 and the optical fiber 12 may be provided in plural.

The sheath 13 may be provided to accommodate the conductor 11 and the optical fiber 12 therein. The sheath 13 may be formed of an insulating material. In addition, the sheath 13 may be provided to be less visible to a user. For example, the sheath 13 may be provided to transmit light. It can be said that the sheath 13 through which light is passed is invisible. Because the invisible sheath 13 is less visible to a user, and thus the invisible sheath 13 does not degrade the appearance of the electronic device, thereby improving the aesthetics.

Alternatively, the sheath 13 may be provided to reflect external light so be less visible to a user. The sheath 13 may be formed of a material that is colorless and has a predetermined reflectivity. The meaning of 'colorless' may include both transparent and opaque. The sheath 13 is formed to have a predetermined reflectivity, and thus reflects light incident on the sheath 13. Accordingly, it is difficult for a user to recognize the conductor 11 and the optical fiber 12 disposed within the sheath 13 with the naked eyes.

According to one embodiment of the present disclosure, the cable 10 may not include filler and the filler is arranged inside the sheath 13 to fill a space among the sheath 13, the conductor 11 and the optical fiber 12. Generally, the filler may prevent the cable from bending over a predetermined angle so as to prevent the optical fiber from being cut due to bending. The filler may be provided to reinforce the optical fiber having a relatively low bending strength. According to one embodiment of the present disclosure, the cable 10 includes the conductor 11 in the inside of the sheath 13, and the conductor 11 has a relatively high bending strength. The bending strength of the cable 10 may be increased due to the conductor 11 disposed inside the sheath 13. Accordingly, the bending strength of the cable 10 is increased and thus even when additional filler is not provided in the inside of the sheath 13, it is possible to prevent the optical fiber 12 from being cut, which is caused by bending of the cable 10.

In addition, according to the present disclosure, the cable 10 may not include an electromagnetic interference (EMI) shielding structure. In general, the cable including the conductor may include the EMI shielding structure for shielding electromagnetic waves that is delivered from the external device to the outside of the cable through the conductor. For example, the EMI shielding structure may include aluminum foil and/or braid wire provided to surround the conductor. However, the cable including the EMI shielding structure has a color prominent to the user, such as black. Accordingly, the cable that is visible to a user may degrade the appearance of the electronic device. In order to improve the aesthetics of an electronic device without degrading the appearance of the electronic device, the cable 10 according to the present disclosure may not include the EMI shielding structure. However, when the cable does not include the EMI shielding structure, it is difficult to shield the EMI in the connector connected to the cable and thus a method for shielding the EMI may be required. According to the present disclosure, as for the cable device including the optical cable that does not include the EMI shielding structure and that is provided to transmit power, it is possible to improve the EMI shielding performance in the connector connected to the optical cable.

Referring to FIG. 3, the cable device 1 according to one embodiment of the present disclosure may include the cable 10 and the connector 100 connected to the cable 10. The connector 100 may include a printed circuit board 110, the plug 101 coupled to the printed circuit board 110 to connect an external device (not shown) to the connector 100, shield cases 121 and 122 provided to accommodate the printed circuit board 110, and the external cases 131 and 132 provided to cover the shield cases 121 and 122. The connector 100 may further include the plug cap 102 provided to protect the plug 101.

The printed circuit board 110 may include a lens 107 provided to deliver an optical signal from the optical fiber 12 to the printed circuit board 110. Inside the lens 107, an optical element 104 (refer to FIG. 5) and a driver integrated circuit (IC) 103 (refer to FIG. 5) configured to control the optical element 104 may be provided. The optical element may include a Vertical Cavity Surface Emitting Laser (VCSEL) chip and a Photodiode (PD) chip.

The shield cases 121 and 122 may be provided to cover an entire surface of the printed circuit board 110. The shield cases 121 and 122 may be provided to accommodate the printed circuit board 110 therein. The shield cases 121 and 122 may include a conductive material. For example, the shield cases 121 and 122 may include a metal material.

The outer cases 131 and 132 may include an insulating material. The outer cases 131 and 132 may be provided in contact with the shield cases 121 and 122. Because the outer cases 131 and 132 have insulating properties, even if the shield cases 121 and 122 have conductivity and current flows through the shield cases 121 and 122, the current may not flow through the outer cases 131 and 132. Therefore, even if a user grips the outer cases 131 and 132, there may be no risk of electric shock caused by the current transmitted from the external device (not shown) to the connector 100 through the cable 10.

Figure 4:
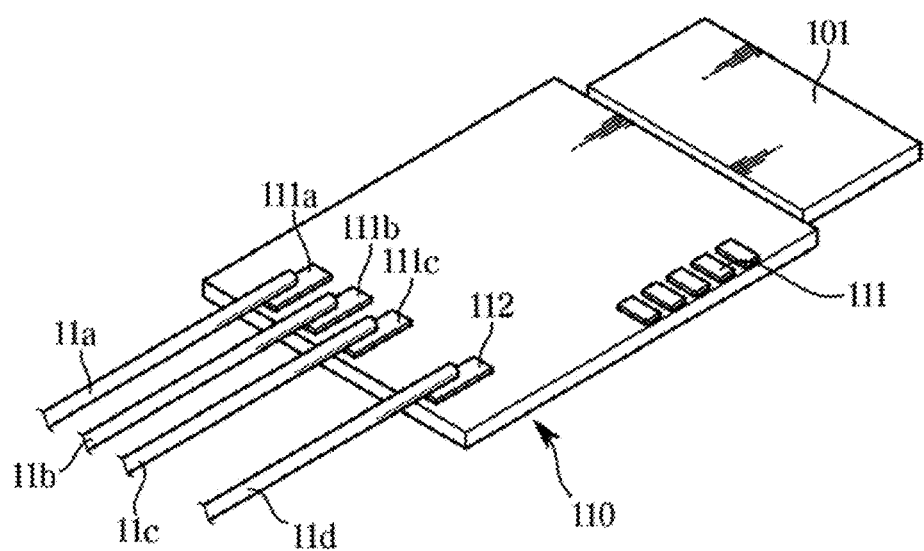
FIG. 4 is a view illustrating a printed circuit board separated from the cable device according to one embodiment of the present disclosure.
Figure 5:
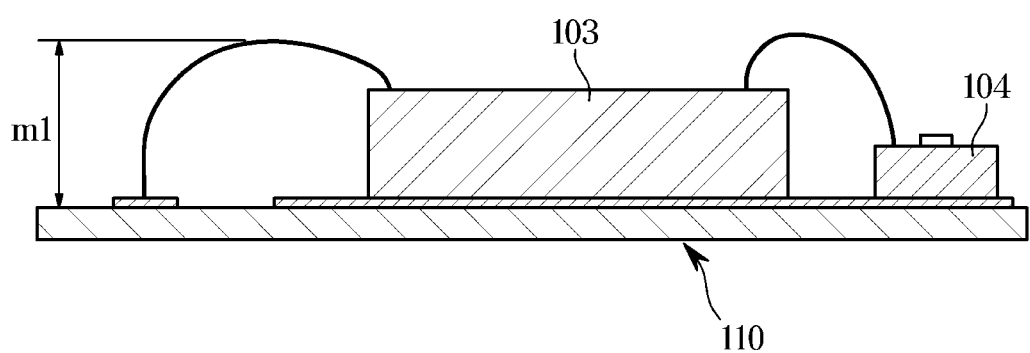
FIG. 5 is a side view of the printed circuit board, an optical element and a driver integrated circuit (IC) mounted on the printed circuit board in the cable device according to one embodiment of the present disclosure.

FIG. 4 is a view illustrating a printed circuit board separated from the cable device according to one embodiment of the present disclosure, and FIG. 5 is a side view of the printed circuit board, an optical element and a driver integrated circuit (IC) mounted on the printed circuit board in the cable device according to one embodiment of the present disclosure.

The printed circuit board 110 and components mounted on the printed circuit board 110 according to the present disclosure will be described in detail with reference to FIGS. 4 and 5. Meanwhile, FIG. 4 is a view not illustrating the optical element 104 and the driver IC 103 configured to control the optical element 104 that is mounted on the printed circuit board 110.

Referring to FIG. 4, the printed circuit board 110 according to one embodiment of the present disclosure may include a power electrode 111 connected to the conductor 11 of the cable 10.

The conductor 11 may be provided in plural. For example, the conductor 11 may include a first conductor 11a, a second conductor 11b, a third conductor 11c, and a fourth conductor 11d.

The power electrode 111 may be provided in plural. For example, the power electrode 111 may include a first power electrode 111a, a second power electrode 111b, and a third power electrode 111c.

The first to third conductors 11a, 11b, and 11c may be disposed in contact with the first to third power electrodes 111a, 111b, and 111c, respectively. The conductor 11 may be provided to transmit power. The conductor 11 may deliver power to the printed circuit board 110 through the power electrode 111. As the number of the conductors 11 and the power electrodes 111 increases, the conductors 11 may deliver greater power to the printed circuit board 110.

The fourth conductor 11d may be disposed in contact with a first ground electrode 112. The first ground electrode 112 may have a digital ground (DGND) potential. The first ground electrode 112 may be operated as a return path of the anode.

The printed circuit board 110 may further include a second ground electrode 111. In the same manner as the first ground electrode 112, the second ground electrode 111 may have a digital ground (DGND) potential and may be operated as a return path of the anode. The second ground electrode 111 may be disposed adjacent to an edge of the printed circuit board 110.

The second ground electrode 111 may be provided in plural. This is to increase a contact area between a contact portion of the shield case and the second ground electrode 111, which will be described later. Hereinafter the ground electrode may refer to the second ground electrode.

As mentioned above, the printed circuit board 110 may include the plug 101. In the drawing, the plug 101 is shown in a simplified manner.

Referring to FIG. 5, the optical element 104 and the driver IC 103 configured to control the optical element 104 may be mounted on the printed circuit board 110 by die bonding. Further, the driver IC 103 may be electrically connected to the optical element 104 by wire bonding. Further, the driver IC 103 may be electrically connected to an electrode on the printed circuit board 110 by wire bonding. Die bonding and wire bonding may be collectively referred to as a chip on board.

As mentioned above, the cable 10 may include the optical fiber 12, and the connector 100 may include the optical element 104 configured to transmit an optical signal to the optical fiber 12 and configured to receive an optical signal from the optical fiber 12. The optical element 104 and the driver IC 103 configured to control the optical element 104 may be mounted on the printed circuit board 110. Because the optical element 104 and the driver IC 103 are vulnerable to heat, it is difficult that the optical element 104 and the driver IC 103 are mounted on the printed circuit board 110 by surface-mount technology (SMT). In addition, the optical element 104 and the driver IC 103 are vulnerable to heat and thus, when a component is mounted around the optical element 104 and the driver IC 103 by the surface-mount technology (SMT) after the optical element 104 and the driver IC 103 are mounted on the printed circuit board 110, the optical element 104 and the driver IC 103 may not function normally due to heat. Therefore, in order to mount a predetermined component on the printed circuit board 110 by using the surface-mount technology (SMT), it is required that the predetermined component is mounted on the printed circuit board 110 by the surface-mount technology (SMT) before the optical element 104 and the driver IC 103 are mounted on the printed circuit board 110.

However, when the predetermined component is mounted on the printed circuit board 110 before the optical element 104 and the driver IC 103, it is possible to interfere with an operation of a mechanical facility (Hereinafter a die bonding apparatus) that performs die bonding and/or wire bonding. Particularly, in the die bonding apparatus, a maximum separation distance from the printed circuit board 110 is predetermined. M1 shown in FIG. 5 may indicate the maximum separation distance of the die bonding apparatus. For example, m1 may be about 1 mm.

When a component, which is higher than the maximum distance m1 of the die bonding apparatus, is placed in the vicinity of the optical element 104 and the driver IC 103 to be die-bonded, the die bonding apparatus may be caught in the component. Accordingly, the die bonding apparatus may not perform normally die bonding. Therefore, it is required that a height of the component mounted on the printed circuit board 110 is less than or equal to the maximum separation distance m1 of the die bonding apparatus.

Based on the shield cases 121 and 122, which is provided to cover the entire surface of the printed circuit board 110, having a GND potential, the EMI shielding performance may be improved. For this, the shield case according to the present disclosure may be provided to have conductivity, and may be provided in direct contact with the ground electrode. In response to the shield case being in contact with the ground electrode, the shield case may have a GND potential. Accordingly, the cable device 1 according to the present disclosure may include the invisible optical cable that does not have an electromagnetic shielding structure, and the EMI shielding performance in the connector 100 may be improved.

As mentioned above, according to the present disclosure, because the shield case is provided in direct contact with the ground electrode, a separate structure may not be mounted on the printed circuit board. Particularly, a separate structure mounted on the printed circuit board to electrically connect the ground electrode of the printed circuit board to the shield case may be not included. In addition, because the printed circuit board is inserted into the shield case after the optical element and the driver IC are die-bonded on the printed circuit board, the shield case may be electrically connected to the ground electrode without interference with the die bonding apparatus.

Figure 6:
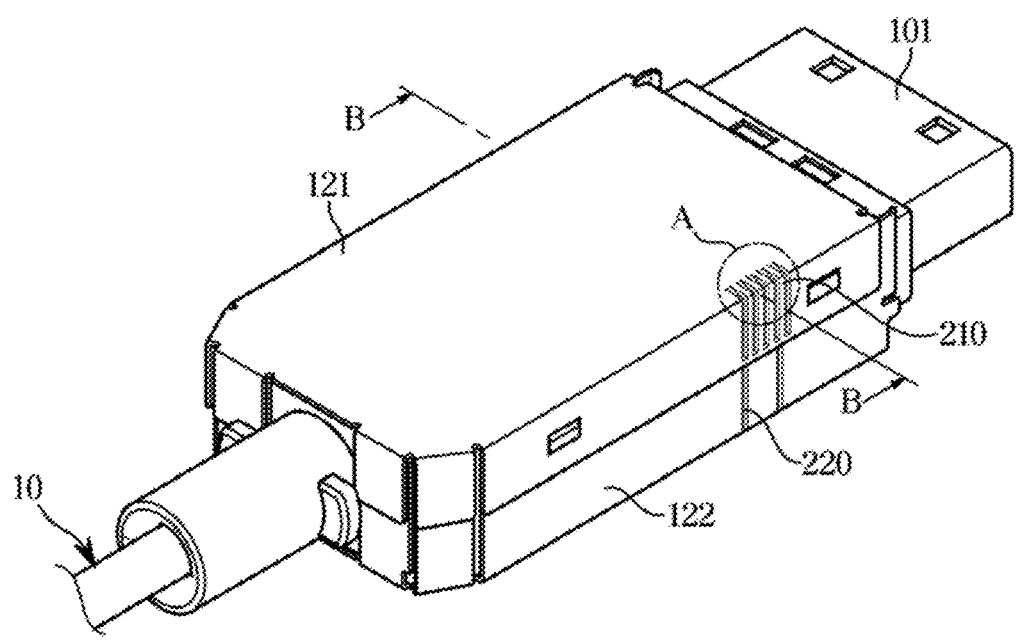
FIG. 6 is a perspective view of the cable device, in which an outer case is removed, according to one embodiment of the present disclosure.
Figure 7:
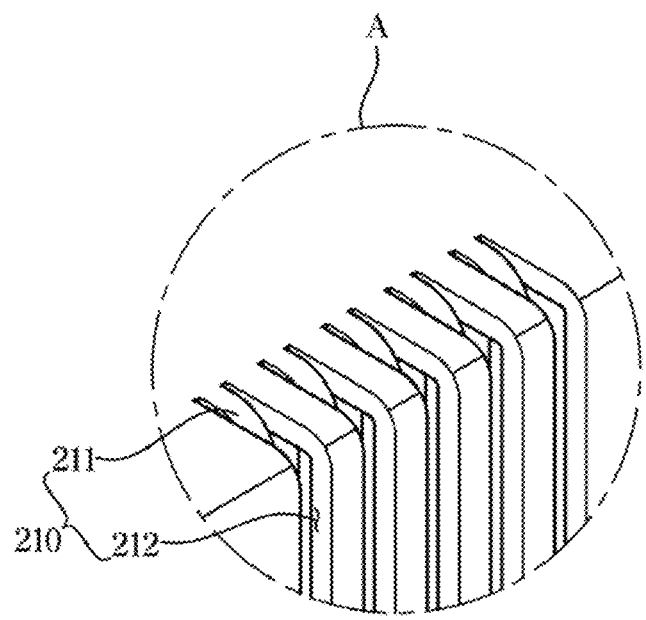
FIG. 7 is an enlarged view of a portion A of FIG. 6.
Figure 8:
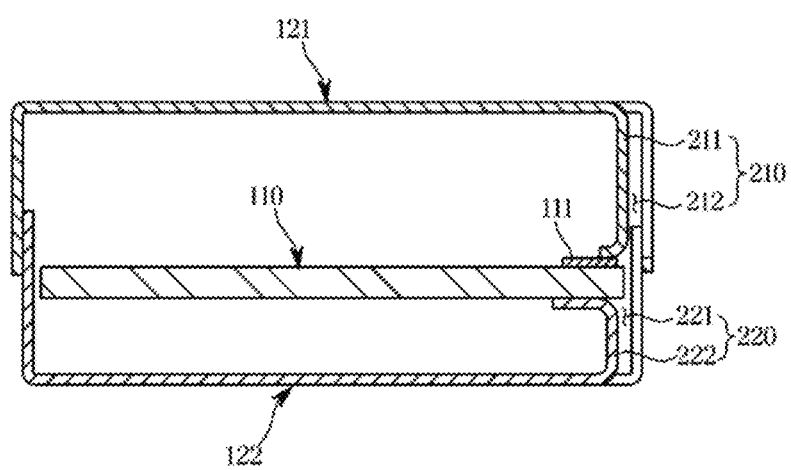
FIG. 8 is a side cross-sectional view of the printed circuit board and a shield case in the cable device according to one embodiment of the present disclosure.

FIG. 6 is a perspective view of the cable device, in which an outer case is removed, according to one embodiment of the present disclosure. FIG. 7 is an enlarged view of a portion A of FIG. 6. FIG. 8 is a side cross-sectional view of the printed circuit board and a shield case in the cable device according to one embodiment of the present disclosure. FIG. 8 is a side cross-sectional view taken along B-B of FIG. 6.

Hereinafter a structure in which the shield case is in direct contact with the ground electrode of the printed circuit board will be described in detail with reference to FIGS. 6 to 8.

Referring to FIG. 6, the shield cases 121 and 122 according to the present disclosure may include an upper shield case 121 and a lower shield case 122. Each of the upper shield case 121 and the lower shield case 122 may have conductivity. For example, the upper shield case 121 and the lower shield case 122 may include a metal material.

According to one embodiment of the present disclosure, the upper shield case 121 may include a contact portion 210. The contact portion 210 may be provided in plural. The lower shield case 122 may include a support portion 220. The support portion 220 may be provided in plural.

Referring to FIG. 7, the contact portion 210 may be formed by cutting and bending a portion of the upper shield case 121. The contact portion 210 may include a bent portion 211 formed by cutting and bending a portion of the upper shield case 121. The contact portion 210 may include a cut-out portion 212 formed upon cutting a portion of the upper shield case 121 to form the bent portion 211.

The cut-out portion 212 may allow the inside of the upper shield case 121 to communicate with the outside of the upper shield case 121. Heat generated by a plurality of elements mounted on the printed circuit board 110 may be discharged to the outside through the cut-out portion 212. Accordingly, the heat dissipation performance of the connector 100 may be improved.

The bent portion 211 may be formed by cutting a portion of the upper shield case 121 and then bending the cut portion into the inside of the upper shield case 121. The bent portion 211 may be disposed inside the upper shield case 121. The bent portion 211 may be provided in such a way that at least a portion of the bent portion 211 is in contact with the ground electrode 111.

Referring to FIG. 8, the connector device according to one embodiment of the present disclosure may include the printed circuit board 110 in which the ground electrode 111 is formed on an upper surface, the contact portion 210 provided in contact with the ground electrode 111, and the support portion 220 provided to support a lower surface of the printed circuit board 110.

As shown in FIG. 8, the printed circuit board 110 may include the ground electrode 111 provided on the upper surface of the printed circuit board 110. The ground electrode 111 may have a digital ground (DGND) potential.

The upper shield case 121 may include the contact portion 210. As described above, the contact portion 210 may include the bent portion 211 formed by cutting and bending a portion of the upper shield case 121, and the cut-out portion 212 formed by cutting a portion of the upper shield case 121.

The bent portion 211 may be bent so as to be disposed inside the upper shield case 121. The bent portion 211 may be provided in direct contact with the ground electrode 111. The bent portion 211 may be bent toward the ground electrode 111 so as to be in contact with the ground electrode 111.

Because the bent portion 211 is in contact with the ground electrode 111, the upper shield case 121 may have the same potential as the ground electrode 111. The upper shield case 121 and the bent portion 211 have conductivity and thus in response to the bent portion 211 being in contact with the ground electrode 111, the bent portion 211 and the upper shield case 121 may have the same potential. In addition, because the lower shield case 122 is in contact with the upper shield case 121, the lower shield case 122 may also have the same potential as the ground electrode 111.

According to the present disclosure, because the shield cases 121 and 122 provided to cover the entire surface of the printed circuit board 110 have a DGND potential, the EMI shielding performance in the connector 100 may be improved. In addition, it is not required that a separate structure, which is for the shield cases 121 and 122 to have a DGND potential, is mounted on the printed circuit board 100, and thus it is possible to simplify the assembly process of the connector 100.

The lower shield case 122 may include the support portion 220. The support portion 220 may include a bent portion 221 formed by cutting and bending a portion of the lower shield case 122 and a cutout portion 222 formed by cutting a portion of the lower shield case 122. The support portion 220 may have the same structure as the contact portion 210. The support portion 220 may have the same configuration as the contact portion 210. The support portion 220 may be provided in contact with one surface of the printed circuit board on which the ground electrode is not provided. In response to the ground electrode 111 being formed on a first surface of the printed circuit board 110, the support portion 220 may be provided to support a second surface of the printed circuit board 110 opposite to the first surface.

According to one embodiment of the present disclosure, the ground electrode may not be provided on the lower surface of the printed circuit board 110. The support portion 220 may be in contact with the lower surface of the printed circuit board 110, thereby supporting the lower surface of the printed circuit board 110.

The support portion 220 may support the printed circuit board 110 to allow the contact portion 210 and the ground electrode 111 to be stably in contact with each other. The support portion 220 may support the printed circuit board 110 to prevent the printed circuit board 110 from moving downward.

The contact portion 210 and the support portion 220 may be provided to be elastically deformable, respectively. The contact portion 210 and the support portion 220 are provided to be elastically deformable, and thus in response to the printed circuit board 110 being inserted into the shield cases 121 and 122, the contact portion 210 and the ground electrode 111 may be stably in contact with each other even if an assembly tolerance occurs.

Figure 9:
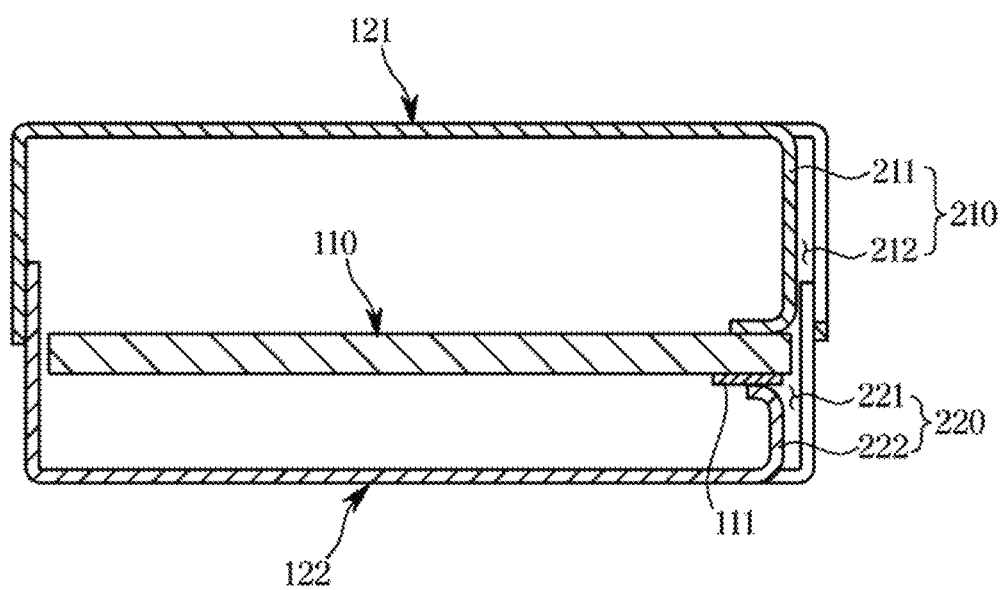
FIG. 9 is a side cross-sectional view of a printed circuit board and a shield case in a cable device according to another embodiment of the present disclosure.

FIG. 9 is a side cross-sectional view of a printed circuit board and a shield case in a cable device according to another embodiment of the present disclosure.

According to another embodiment of the present disclosure, a ground electrode 111 may be formed on a lower surface of a printed circuit board 110. A lower shield case 122 may include a contact portion 220 provided in contact with the ground electrode 111. An upper shield case 121 may include a support portion 210 provided to support the upper surface of the printed circuit board 110.

As mentioned above, because the contact portion and the support portion have the same structure, the contact portion and the support portion may be distinguished from each other depending on whether to be in contact with the ground electrode. As shown in FIG. 9, in response to that the ground electrode 111 is formed on the lower surface of the printed circuit board 110, the lower shield case 122 may include the contact portion 220, and the upper shield case 121 may include the support portion 210.

Other than the location of the ground electrode 111 and the arrangement of the contact portion 220 and the support portion 210, the remaining configurations are the same as those of the above-described embodiment, and thus a description thereof will be omitted.

Figure 10:
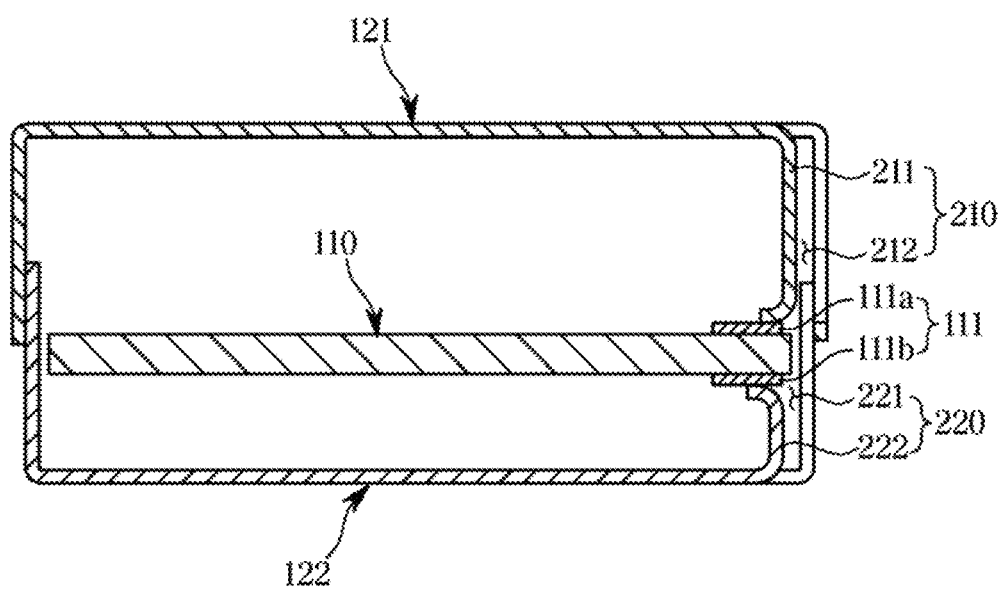
FIG. 10 is a side cross-sectional view of a printed circuit board and a shield case in a cable device according to still another embodiment of the present disclosure.

FIG. 10 is a side cross-sectional view of a printed circuit board and a shield case in a cable device according to still another embodiment of the present disclosure.

According to still another embodiment of the present disclosure, a ground electrode 111 may include an upper ground electrode 111a formed on an upper surface of a printed circuit board 110, and a lower ground electrode 111b formed on a lower surface of the printed circuit board 110. In addition, an upper shield case 121 may include a first contact portion 210, and a lower shield case 122 may include a second contact portion 220. According to the embodiment, the ground electrode may be formed on both sides of the printed circuit board. The upper shield case and the lower shield case may include a contact portion, respectively, but the upper shield case and the lower shield case may not include the support portion.

According to still another embodiment of the present disclosure, the number of the ground electrode 111 and the contact portions 210 and 220 provided in contact with the ground electrode 111 may be increased. In addition, an area of the contact portions 210 and 220 in contact with the ground electrode 111 may be increased. Accordingly, the shield cases 121 and 122 may more stably maintain the DGND potential, and the EMI shielding performance of the connector 100 may be improved.

While the present disclosure has been particularly described with reference to exemplary embodiments, it should be understood by those of skill in the art that various changes in form and details may be made without departing from the spirit and scope of the present disclosure.

The invention claimed is:

1. A cable device comprising:
a cable; and
a connector connected to the cable,
wherein the connector includes:
 a printed circuit board including a ground electrode, and
 a shield case to accommodate the printed circuit board therein, the shield case including an upper shield case and a lower shield case,
the upper shield case includes a contact portion in direct contact with the ground electrode,
the lower shield case includes a support portion to support the printed circuit board to prevent the contact portion and the ground electrode from being separated from each other, and
the support portion includes:
 a bent portion formed by cutting and bending of the lower shield case, and
 a cut-out portion formed by cutting a portion of the lower shield case to form the bent portion.

2. The cable device of claim 1, wherein
the cable includes:
 a conductor to transmit power, and
 an optical fiber to transmit an optical signal.

3. The cable device of claim 1, wherein
the shield case includes a conductive material to be electrically connected to the ground electrode by contact with the ground electrode.

4. The cable device of claim 2, wherein
the cable includes a sheath to accommodate the conductor and the optical fiber therein, and to transmit light.

5. The cable device of claim 1, wherein
the contact portion is formed by cutting and bending a portion of the upper shield case.

6. The cable device of claim 5, wherein
the upper shield case includes a cut-out portion formed together with the contact portion to allow an inside of the shield case to communicate with an outside of the shield case.

7. The cable device of claim 1, wherein
in response to the contact portion being in contact with a first surface of the printed circuit board, the support portion is in contact with a second surface of the printed circuit board opposite to the first surface.

8. The cable device of claim 1, wherein
the ground electrode is positioned on an upper surface or a lower surface of the printed circuit board.

9. The cable device of claim 1, wherein
the contact portion and the support portion are elastically deformable.

10. The cable device of claim 1, wherein
the contact portion and the support portion are disposed inside the shield case so as to be in contact with the printed circuit board.

11. The cable device of claim 1, wherein the connector includes:
  an optical element mounted on the printed circuit board, and
  a driver integrated circuit (IC) mounted on the printed circuit board and configured to control the optical element.

12. The cable device of claim 11, wherein:
the optical element and the driver IC are mounted on the printed circuit board by die bonding.

13. The cable device of claim 1, wherein the connector includes:
  an outer case provided to accommodate the shield case therein, and including an insulating material, and
  a plug connected to the printed circuit board to connect a connection portion of an external device to the connector.

* * * * *